May 5, 1970   J. M. NEWTON   3,510,153
UNIVERSAL CONNECTING JOINT
Filed Oct. 14, 1968   2 Sheets-Sheet 1
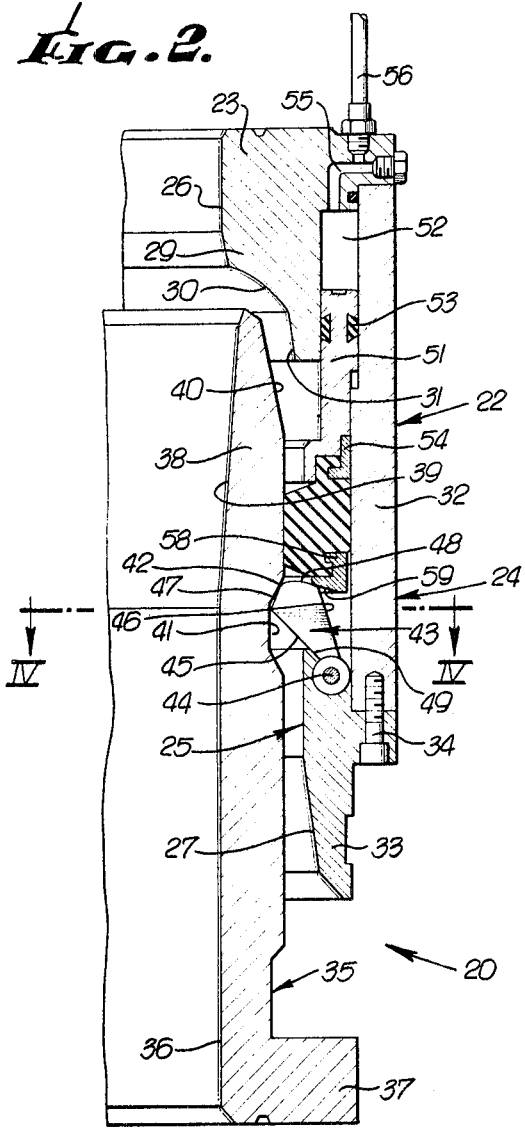
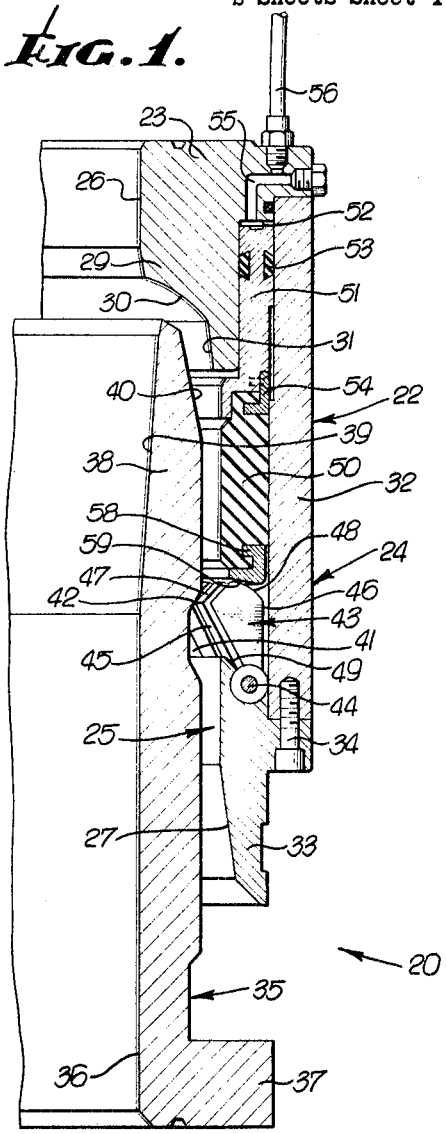
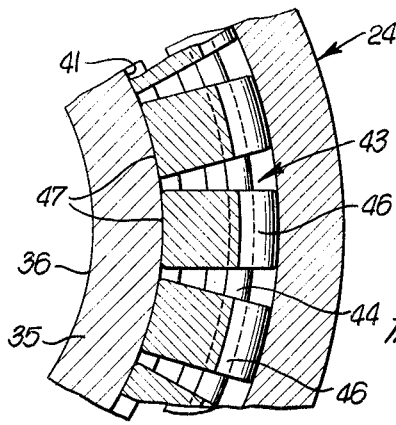
INVENTOR.
JAMES M. NEWTON
By
Mikette, Glenny, Poms & Smith
ATTORNEYS.

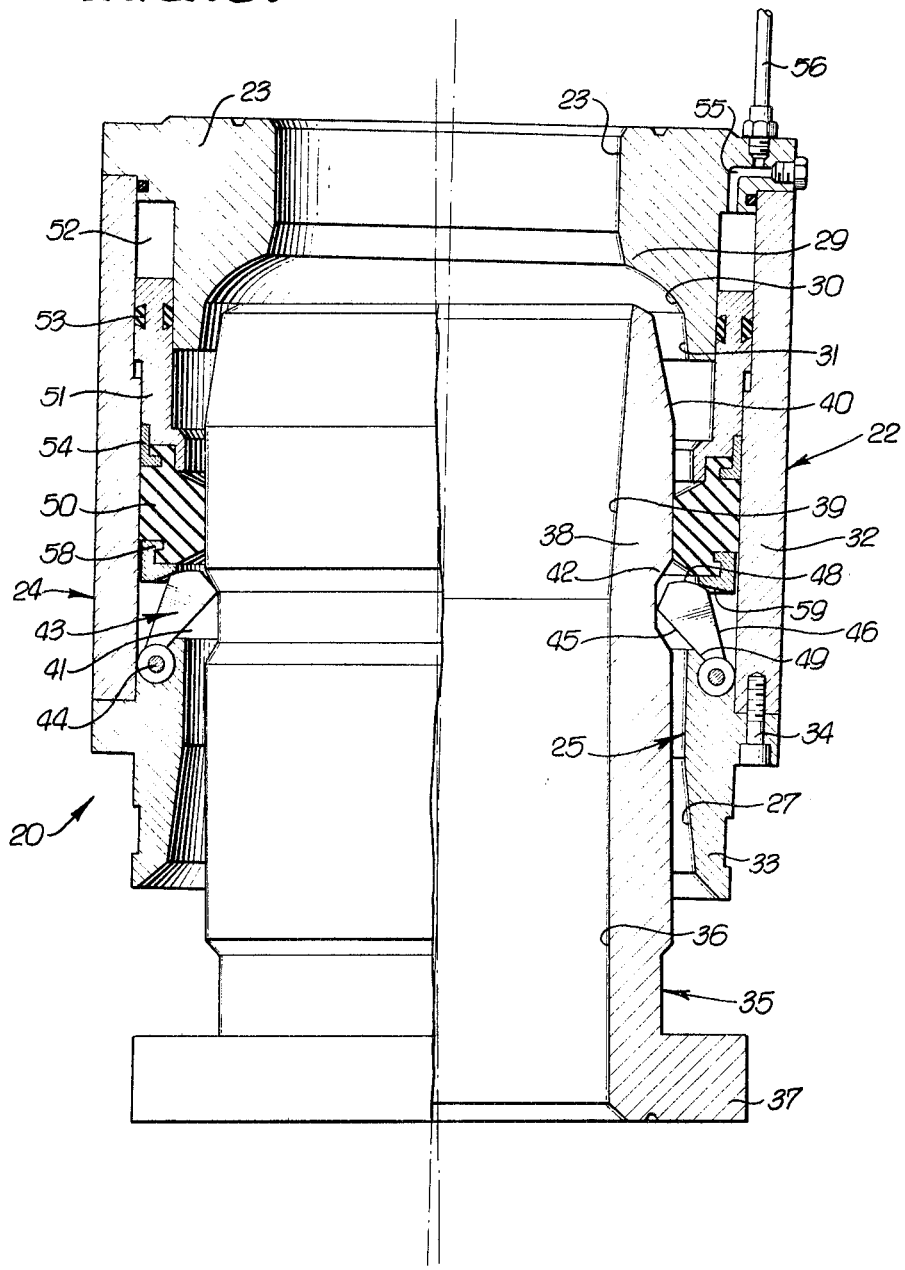

United States Patent Office 3,510,153
Patented May 5, 1970

3,510,153
UNIVERSAL CONNECTING JOINT
James M. Newton, Anaheim, Calif., assignor to Shaffer Tool Works, Brea, Calif., a corporation of California
Filed Oct. 14, 1968, Ser. No. 767,139
Int. Cl. F16l 55/00
U.S. Cl. 285—18                                    12 Claims

ABSTRACT OF THE DISCLOSURE

A flexible, quick-release universal connecting joint construction for use with fluid conducting members to permit disalignment of such members, the construction including inner and outer housings, the outer housing having a chamber for receiving the inner housing and permitting disalignment of the inner housing with respect to the outer housing. The outer housing has provision for positively limiting axial movement of the inner housing with respect to the outer housing without restricting angular movement between such housings.

---

The present invention is a further development of the connecting joint shown in U.S. Letters Patent 3,378,281.

Background of the invention

In drilling subsea oil wells, the wellhead equipment is lowered to the ocean floor from a floating vessel, platform or the like and most of the well drilling and well completion operations are carried out through a large-diameter marine pipe conductor string or riser, formed by a plurality of fluid conducting members, extending from the surface to the underwater wellhead. While it is desirable to maintain the surface vessel immediately above the wellhead so that a fluid conducting string is vertically oriented, this ideal condition is not normally achieved. Ocean waves, water currents, the wind and other forces of nature constantly urge the surface vessel away from the normal aligned position so as to cause disalignment of the fluid conductor members with a wellhead. While the lateral movement of the surface vessel can be prevented to a certain extent, it has been found that it is nearly impossible to maintain constant vertical orientation of the marine pipe conductor string.

It is known that marine fluid conductor members which are rigid, i.e., the conductor members are fixedly and unyieldingly mounted to one another, are entirely unsatisfactory because of the above-described disalignment problems and actual rupture of such conductor members may take place where the disalignment is appreciable. It has therefore been suggested in the prior art that the fluid conductor member should be provided with a universal connecting joint between two members, preferably at the submerged wellhead and just above the blowout preventer. While such devices succeeded in solving some of the attendant problems to disalignment of the fluid conductor members, it has been found that the universal connecting joint of the present invention provides further advantages and improvements in such connectors, particularly in the provision of limiting relative axial movement in one direction.

Summary of invention

The present invention contemplates a connecting joint means for subsea use which utilizes locking dogs and seal means carried by one fluid conductor member and operable as a unit to lock and seal against the other fluid conductor member while permitting axial misalignment of the conductor members.

Accordingly, it is a general object of the present invention to provide a universal connecting joint construction that compensates for disalignment between a surface vessel and a wellhead thereby preventing rupture or damage to a pipe conductor string used for the well drilling and well completion operations.

An object of the present invention is to disclose and provide a flexible, quick-release universal connecting joint construction which can be remotely operated to effect a releasable connection and which provides a constant seal between the concentric connecting members when the joint construction is in use.

Another object of the present invention is to provide and disclose a flexible, quick-release safety universal connecting joint construction for use with fluid conductor members to permit disalignment of such members in which the two connecting members joined to two fluid conductor members to be connected are positively engaged so as to withstand high tensile loads in the conductor string.

A further object of the present invention is to disclose and provide a universal connecting joint device for use between adjacent fluid conductor members to prevent disalignment of such members and effect positive locking between the two members through the use of metal-to-metal locking means.

Generally stated, the flexible, quick-release universal connecting joint construction for use with fluid conductor members to permit disalignment of such members of the present invention comprises an outer connecting housing member adapted to be connected to a first fluid conductor member and comprising an enlarged axially extending chamber having a bottom opening, a reduced diameter top opening, and stop shoulder means, an inner connecting housing member received in the outer housing member and adapted to be connected to a second fluid conductor member which may be in occasional disalignment with the first member, the inner connecting housing member comprising an axially extending chamber, a locking groove on the outer surface thereof, and an end portion for engaging the stop shoulder on the outer housing member to limit axial and angular movement between the first and second fluid conductor members, an annular resilient sealing element supported between the inner and outer connecting housing members, locking means within the outer housing member for selectively engaging the locking groove to limit axial movement in the direction opposite to that limited by the stop shoulder on the outer housing member without restricting annular movement between the first and second drill fluid conductor members, and including provision for selectively applying pressure to the annular resilient sealing element to cause radially inward flow of the element to effect a seal between the inner and outer housing members and effecting a lock between the inner and outer housing members.

Other objects and advantages of this invention will be readily apparent from the following description when considered in connection with the appended drawings.

In the drawings:

FIG. 1 is a partial side sectional view of an exemplary universal connecting joint construction constructed in accordance with the present invention showing the connecting housings in disengaged and aligned position, the section being taken in a plane passing through the axis of the joint;

FIG. 2 is a fragmentary sectional view similar to FIG. 1 showing the joint construction in engaged and aligned position;

FIG. 3 is a sectional view similar to FIG. 2 showing the joint construction in disaligned position; and FIG. 4 is a transverse sectional view taken along the plane IV—IV of FIG. 2.

Referring now to the drawings, a detailed explanation will be made of a preferred exemplary embodiment of the universal connecting joint construction of the present invention. It will be understood that the universal connecting joint, indicated generally at 20, may be disposed between a blowout preventer means on a submerged wellhead and a riser pipe system extending therefrom to a surface vessel. The universal connecting joint of the present invention functions to permit the disalignment between such adjacent fluid conductor members so as to prevent rupture or damage of the riser pipe system when the surface vessel is displaced from its normal position vertically above the wellhole.

The universal connecting joint 20 generally comprises an outer connecting housing means and an inner connecting housing means which are selectively secured to prevent axial movement therebetween while permitting disalignment of the fluid conductor members and simultaneously sealing the inner and outer housing means to prevent the entry of water into the conductor string. In the exemplary embodiment, such outer connecting housing means comprises an outer generally cylindrical member 22 which includes an upper body portion 23 and a lower outer body portion 24. Upper and lower body portions 23, 24 define an enlarged axially extending chamber indicated generally at 25 and a reduced diameter top opening 26. The axially extending chamber 25 which may be of generally enlarged uniform diameter below opening 26, has an outwardly flared bottom opening 27 for permitting axial disalignment.

The upper body portion 23 of outer member 22 is provided with stop shoulder means, which in this exemplary embodiment comprises a shoulder 29 having a radially outwardly and downwardly inclined lower stop surface 30. The lower stop surface 30 may have an arcuate or convex spherical segment surface for reasons to be explained more fully hereinafter. Lower stop surface 30 terminates in a slightly outwardly inclined surface 31.

The lower body portion 24 of outer cylindrical member 22, in the exemplary embodiment, comprises a cylindrical side wall 32 to which is mounted a bottom annular wall 33 through a plurality of bolts one of which is indicated 34, wall 33 providing opening 27.

The inner connecting housing means in the exemplary embodiment comprises an inner generally cylindrical member 35. Cylindrical member 35 has an outside diameter which is less than the diameter of the enlarged axially extending chamber 25 of outer cylindrical member 22 and is received therein. Inner cylindrical member 35 is also provided wtih an axially extending chamber indicated at 36 and a lower flange 37. The inner cylindrical member includes an upper end portion 38 for abutting shoulder 29 of the outer cylindrical member 22 to limit upward axial movement of inner cylindrical member 35 within the outer cylindrical member 22. The upper end portion 38 is defined by a radially outwardly and upwardly inclined inner surface 39 and in part by a radially inwardly and upwardly inclined outer surface 40.

Longitudinally spaced below upper end portion 38, the outer surface of inner cylindrical member 35 is provided with an annular locking groove 41 which defines an annular inclined stop shoulder or locking surface 42 for limiting relative movement between the inner and outer housings in one direction.

The flexible, quick-release universal connecting joint construction of the present invention also comprises locking means for securing the inner cylindrical member 35 within the outer cylindrical member 22. Such locking means in the exemplary embodiment comprises a plurality of locking dogs 43 pivotally mounted on an anchor ring 44 carried by bottom wall 33 of outer cylindrical member 22. The locking dogs are annularly arranged so as to define a contracting and expanding annular ring for selectively engaging the annular locking groove 41.

Each of the locking dogs 43 have angularly disposed inner and outer surfaces 45, 46, respectively, an engagement surface 47, and an upper surface 48. When assembled on the anchor ring 44, upper surfaces 48 of the plurality of locking dogs 43 collectively or compositely define a convex spherical segment surface, and the composite engagement surfaces 47 define an inverted frustoconical surface.

The universal connecting joint device also includes seal means for providing a fluid tight connection between the inner and outer cylindrical members. In the exemplary embodiment, such seal means comprises an annular resilient sealing element 50 disposed between the cylindrical side wall 32 of outer cylindrical member 22 and the upper end portion 38 of inner cylindrical member 35 and above the locking dogs 43. The annular resilient sealing element 50 may be formed of suitable resilient materials such as natural or synthetic rubber, and it has been found that Hycar-Buna having a Shore hardness between 50–80 is particularly suited for such a sealing material.

The quick-release connector device also includes means for selectively applying pressure to the annular resilient sealing element 50 to cause radial inward flow of element 50 to effect a seal between the inner and outer cylindrical housings and also to cause inward movement of locking dogs 43 into engagement with surfaces of the annular locking groove 41. In the exemplary embodiment, the means for selectively applying pressure comprises an annular piston means 51 disposed within an annular chamber 52 between the cylindrical side wall 32 of outer cylindrical member 22 and an annular recess formed in the outer cylindrical surface of upper body portion 23. Piston 51 is provided with suitable sealing means 53 and carries an annular inturned lip 54 at the lower end thereof secured to the annular resilient sealing element 50, such as by being molded integrally into the sealing element as in the exemplary embodiment. The upper portion of annular piston chamber 52 is provided with a fluid port 55 through which pressure fluid is introduced by remote control into the pressure tight annular piston chamber 52. A fluid pressure line 56 may be connected to port 55 for supplying fluid under pressure and for relieving pressure within chamber 52.

An annular follower or bearing ring 58, comprising a portion of the means for selectively applying pressure to the locking dogs 43, is disposed above the locking dogs and is secured to the annular resilient sealing element 50, such as by integral molding as in the exemplary embodiment. The lower surface 59 of the bearing ring 58 is formed with a concave spherical segment surface which matingly engages the upper surface of the locking dogs 43.

In operation, the outer cylindrical member 22 is connected to one section of a pipe riser system and the inner cylindrical member 35 may be connected to a blowout preventer above submerged wellhead. The riser section and member 35 are universally joined by inserting the inner cylindrical member 35 within the outer cylindrical member 22, as shown in FIG. 1. During the insertion, all fluid pressure is relieved from annular piston chamber 52 so that the piston 51 is in its uppermost position and is not bearing upon the annular resilient sealing element 50 nor the locking dogs 43. Axial or longitudinal movement of the inner cylindrical member with the enlarged axially extending chamber 25 of the outer cylindrical member is limited by the engagement of the upper edge of upper end portion 38 of the inner cylinder against the shoulder 29 formed on the upper body portion 23 of the outer cylindrical member 22.

The two cylindrical members, and therefore the pipe riser system and wellhead means, are secured to one another by applying pressure to the piston 51 which will bear axially upon the annular resilient sealing element 50 forcing the resilient material to flow radially inwardly so as to tightly engage the outer surface of the upper end portion 38 of the inner cylindrical member 35 to form a seal between the two cylindrical members. Concurrently, the axial movement of the piston is transmitted to bearing ring 58 (with some reduction in axial movement due to the deformation of the annular resilient sealing element 50), so that the lower surface of the bearing ring 58 bears upon the upper spherical segment surface of the composite locking dogs forcing the locking dogs inwardly and into the annular locking groove 41. The engagement surfaces 47 of the locking dogs 43 bear upon the inclined stop shoulder or locking surface 42 of locking groove 41 so as to limit downward axial movement and preventing withdrawal and separation of the inner cylindrical member 35 with respect to the outer cylindrical member. It will therefore be seen that axial movement of the cylindrical members with respect to one another is limited by metal-to-metal contact between the locking dogs 43 and stop shoulder 42 (when the cylindrical members are in tension) or between upper end portion 38 of cylindrical member 22 and stop shoulder 30 (when the cylindrical members are in compression).

During use of the universal connecting joint construction 20, the two cylindrical members may become disaligned, as seen in FIG. 3. In such disaligned condition, the resilient annular sealing element 50 remains in continuous sealing engagement with the outer surface of the upper end portion 38 of the inner cylindrical member 35. Moreover, it will be seen that disalignment does not affect the engagement of the locking dogs with the annular locking groove. In the circumferential segment where the upper portions of the two cylinders are brought more closely together (as at the left of FIG. 3 and not shown), the annularly arranged locking dogs in such circumferential segment will have their pivotally mounted ends forced radially outwardly while engagement of the spherical surfaces of the locking dogs and bearing ring, and the abutting contact of dog surfaces 47 with shoulder 42 will be maintained. On the diametrically opposite side, as shown in FIG. 3, the bearing ring remains engaged with surface 48 of the locking dogs and provides a radially inwardly directed force to maintain those locking dogs engaged in the locking groove although separated from shoulder 42. The resilient seal ring, under such conditions may progressively expand around the inner circumference of the seal ring to maintain pressure contact between surfaces 48 on the dogs and surfaces 59 on metal pressure ring 58. Thus a pressure seal is maintained even during misalignment. Disalignment of device 20 is limited by engagement of the upper edge of upper end portion 38 of inner member 35 with inclined surface 31 on upper body portion 23 of outer member 22. Flared bottom opening 27 will also limit disalignment of the two members when the inner member 35 engages the inner wall of opening 27.

Pivotal movement of dogs 43 about anchor ring 44 is limited in an outward direction by wall 32 and in an inward direction by beveled surface 49 provided on annular wall 25. It will be apparent that in initial assembly and reception of the inner member into chamber 25 of the outer member, the dogs 43 will be contacted by top surfaces 40 and urged outwardly about their pivotal mounting.

When it is desired to disconnect the two cylindrical members, the fluid pressure within annular piston chamber 52 is relieved so that the piston, resilient sealing element, and bearing ring move axially upwardly to allow space for the locking dogs to withdrawn from the annular locking groove. When the piston is retracted and there is an absence of a radially inwardly directed force to hold dog face 47 against the inclined face of shoulder 42, it will be apparent that shoulder 42 will urge the dogs radially outwardly to clear the shoulder 42 and to permit separation of the inner and outer members.

The directional terms, "upper" and "lower" have been used herein with only relative connotation to aid in describing the device; while the device is preferably oriented as in the foregoing description and drawings, the device may be used while inverted and thus the directional terms are not intended to require any particular orientation with respect to any external elements.

It will therefore be seen that the present invention provides a quick-release universal connecting joint construction which has metal-to-metal engagement between the two cylindrical members and a constant sealing engagement between such members even during misalignment conditions. Obviously many modifications and variations of the present invention are possible in light of the above teaching. It is therefore to be understood that the invention may be practiced otherwise than as specifically described.

I claim:

1. In a flexible, quick-release universal connecting joint construction for use with fluid conductor members to permit disalignment of such sections, the combination of:

outer connecting housing means adapted to be connected to a first fluid conductor member and comprising an enlarged axially extending cylindrical chamber having a bottom opening, a reduced diameter top opening, and stop shoulder means;

inner connecting housing means received in said outer connecting housing means and adapted to be connected to a second fluid conductor member in occasional disalignment with said first member, said inner connecting housing means comprising an axially extending chamber, an outwardly directed locking surface on the outer surface of said inner housing means, said outer surface having a diameter less than the inner diameter of said outer connecting housing means cylindrical chamber to permit axial disalignment of said inner connecting housing means within said outer connecting housing means chamber, and an end portion for engaging said stop shoulder means to limit axial and angular movement between said first and second fluid conductor members;

seal means comprising an annular resilient sealing element supported between said inner and outer connecting housing means;

locking means supported within said outer housing means for selectively engaging said locking surface to limit axial movement in the direction opposite to that limited by said stop shoulder means without restricting angular movement between said first and second fluid conductor members; and means for selectively applying pressure to said annular resilient sealing element to cause radial inward flow of said element to effect a seal between said inner and outer housing means and wherein said sealing element causes movement of said locking means into bearing engagement with said locking surface.

2. The flexible, quick-release universal connecting joint construction of claim 1 wherein said locking means comprises a plurality of locking dogs pivotally mounted on said outer connecting housing means.

3. The flexible, quick-release universal connecting joint construction of claim 2 wherein said locking dogs have upper surfaces which compositely define a convex surface and said means for causing movement of said locking dogs includes a bearing ring having a concave surface engaging said locking dog upper surfaces.

4. In a flexible, quick-release universal connecting joint construction for use with fluid connector members to permit disalignment of such members, the combination of:

an outer generally cylindrical member having an enlarged axially extending cylindrical chamber with a bottom opening and a reduced diameter top opening, and a stop shoulder adjacent said top opening and having a radially outwardly and downwardly inclined surface;

an inner generally cylindrical member having a diameter less than the diameter of said outer member cylindrical chamber so as to permit disalignment of such members comprising an axially extending chamber, an end portion for engaging said stop shoulder inclined surface to limit upward axial movement of said inner member with respect to said outer member and to limit angular movement between said inner and outer members, and an annular locking surface on the outer surface of said inner member and spaced axially from said end portion;

an annular resilient sealing element disposed between said inner and outer members;

a pressure operated, remotely controlled, annular piston means carried by said outer member and engaging the upper end of said resilient sealing element; and locking means supported by said outer member for selectively engaging said annular locking surface, said locking means engaging the lower end of said resilient sealing element and rendered operative upon axial movement of said sealing element by said annular piston means;

whereby said annular piston means may be selectively operated so as to deform said annular resilient sealing element into tight sealing contact with said inner member, and for causing engagement of said locking means and said annular locking surface so as to limit axial movement in one direction without restricting angular movement between said inner and outer members.

5. The flexible, quick-release universal connecting joint construction of claim 4 wherein said locking means comprises a plurality of locking dogs pivotally mounted at one end within said outer cylindrical member, each of said locking dogs having a radially outwardly and downwardly inclined surface so that an axial force exerted on said dogs by said resilient sealing element forces said locking dogs radially inwardly.

6. The flexible, quick-release universal connecting joint construction of claim 5 wherein said annular resilient sealing element additionally includes an integrally mounted annular bearing ring for engaging said locking dogs.

7. The flexible, quick-release universal connecting joint construction of claim 6 wherein said locking dog upper surfaces compositely define a convex surface and the lower surface of said bearing ring is a concave segment surface.

8. In a universal joint construction including one housing member having a chamber and another member normally received within said chamber in axial alignment with said one member and in spaced relation thereto for limited axial misalignment and limited longitudinal relative displacement, a resilient seal means carried by said one member and an actuating means for applying pressure to said seal means carried by said one member and adapted to press said seal means against a sealing surface on said other member for sealing engagement therewith; the provision of:

movable means on said one member for pressure contact with said seal means upon actuation thereof for movement toward said other member;

and means on said other member releasably engaged with said movable means for unyieldingly limiting relative longitudinal displacement of said members while providing limited axial misalignment of said members and maintaining said sealing engagement of said seal means with said other member.

9. A joint construction as stated in claim 8 wherein said movable means on said one member include a plurality of circularly arranged locking elements each having contact with said seal means and with said other member in locked condition.

10. A joint construction as stated in claim 8 wherein said movable means on said one member include pivotally mounted locking elements having angularly related surfaces remote from the pivotal mounting for respective engagement with said seal means and with said engageable means on said other member.

11. A joint construction as stated in claim 8 wherein said movable means on said one member includes:

radially inwardly and outwardly pivotally movable locking elements having a contact surface for said seal means and an engageable surface for engagement with said means on said other member;

means limiting radial inwardly directed movement of said locking elements;

said releasably engageable means on said other member being cooperable with said locking elements for assisting in retraction of said locking elements in the absence of pressure contact of said seal means with said locking elements.

12. A joint construction as stated in claim 8 wherein said movable means on said one member include a plurality of circularly arranged locking elements;

said seal means includes a material section elongated in the direction of the axes of said members and includes at one end of said material section a pressure contact face for engagement with said locking elements;

whereby under conditions of axial misalignment, said pressure surface on said seal means may lie in askew relation to the axis of said other member while maintaining sealing engagement with said other member and locking pressure on said locking elements.

References Cited

UNITED STATES PATENTS

| | | | |
|---|---|---|---|
| 2,952,482 | 9/1960 | Torres | 285—320 X |
| 2,962,096 | 11/1960 | Knox | 285—18 X |
| 3,147,992 | 9/1964 | Haeber et al. | 285—18 |
| 3,378,281 | 4/1968 | Smith | 285—27 |

DAVID J. WILLIAMOWSKY, Primary Examiner

D. W. AROLA, Assistant Examiner

U.S. Cl. X.R.

285—315, 320